(12) United States Patent
Lee et al.

(10) Patent No.: US 9,768,439 B2
(45) Date of Patent: Sep. 19, 2017

(54) APPARATUS FOR PREPARING ELECTRODE ASSEMBLY

(71) Applicant: LG Chem, Ltd., Seoul (KR)

(72) Inventors: Joo-Sung Lee, Daejeon (KR);
Da-Kyung Han, Daejeon (KR);
Kyung-Ryun Ka, Daejeon (KR);
Jong-Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 117 days.

(21) Appl. No.: 14/483,469

(22) Filed: Sep. 11, 2014

(65) Prior Publication Data

US 2015/0034249 A1   Feb. 5, 2015

Related U.S. Application Data

(63) Continuation of application No. PCT/KR2014/000487, filed on Jan. 16, 2014.

(30) Foreign Application Priority Data

Jan. 16, 2013  (KR) .......................... 10-2013-0004843

(51) Int. Cl.
*B29C 65/48* (2006.01)
*B29C 65/52* (2006.01)
(Continued)

(52) U.S. Cl.
CPC ....... *H01M 4/0404* (2013.01); *B32B 37/1292* (2013.01); *B32B 38/0008* (2013.01);
(Continued)

(58) Field of Classification Search
USPC .............. 156/379.7, 387, 538, 539, 555–557
See application file for complete search history.

(56) References Cited

U.S. PATENT DOCUMENTS 7,318,984 B2 * 1/2008 Satsuma ............. H01M 2/1673
29/623.1
7,951,492 B2 * 5/2011 Kim ....................... H01M 2/16
429/128

(Continued)

FOREIGN PATENT DOCUMENTS

CN      102668172 A    9/2012
EP       2824733 A1    1/2015
(Continued)

OTHER PUBLICATIONS

Chris Woodford, "Laser printers How do they work? Who invented them ?", Jan. 2, 2013 (Jan. 2, 2013), XP055217939, Retrieved from the Internet: URL:https://web.archive.org/web/20130102210232/http://www.explainthatstuff.com /laserprinters .htm l[retrieved on Oct. 2, 2015].

(Continued)

*Primary Examiner* — Sing P Chan
(74) *Attorney, Agent, or Firm* — Lerner, David, Littenberg, Krumholz & Mentlik, LLP

(57) ABSTRACT

The present disclosure provides an apparatus for preparing an electrode assembly, comprising a printing unit including a charging mean for bringing polymer particles into electric charging to obtain electrically charged polymer particles, and a transferring mean for coating the electrically charged polymer particles by way of transferring on at least one surface of a substrate for an electrochemical device to form an adhesive layer on the substrate, the substrate being at least one of a cathode, an anode and a separator; and a laminating unit that applies heat and pressure to the substrate having the adhesive layer formed thereon so as to obtain the electrode assembly comprising the cathode, the anode and the separator interposed therebetween.

20 Claims, 2 Drawing Sheets

(51) Int. Cl.

| | |
|---|---|
| *B32B 37/12* | (2006.01) |
| *B32B 37/24* | (2006.01) |
| *B32B 43/00* | (2006.01) |
| *H01M 4/04* | (2006.01) |
| *H01M 10/04* | (2006.01) |
| *H01M 4/13* | (2010.01) |
| *B32B 38/00* | (2006.01) |
| *H01M 2/16* | (2006.01) |
| *H01M 10/058* | (2010.01) |
| *H01M 10/052* | (2010.01) |

(52) U.S. Cl.
CPC .............. *H01M 2/168* (2013.01); *H01M 4/13* (2013.01); *H01M 10/0404* (2013.01); *B32B 2305/026* (2013.01); *B32B 2315/00* (2013.01); *B32B 2398/20* (2013.01); *B32B 2457/10* (2013.01); *H01M 10/052* (2013.01); *H01M 10/058* (2013.01)

(56) References Cited

U.S. PATENT DOCUMENTS

| | | | |
|---|---|---|---|
| 7,981,572 B2 * | 7/2011 | Fujiki | H01M 8/0271 429/400 |
| 2003/0215704 A1 * | 11/2003 | Satsuma | H01M 2/1673 429/142 |
| 2006/0127774 A1 * | 6/2006 | Kim | H01M 2/16 429/246 |
| 2007/0271770 A1 | 11/2007 | Fujiki et al. | |
| 2008/0199781 A1 | 8/2008 | Lunt et al. | |
| 2011/0045333 A1 | 2/2011 | Kim et al. | |
| 2011/0064988 A1 | 3/2011 | Yu | |
| 2011/0097651 A1 | 4/2011 | Yim et al. | |
| 2012/0015254 A1 | 1/2012 | Lee et al. | |
| 2013/0017429 A1 * | 1/2013 | Ha | H01M 2/1653 429/144 |
| 2013/0292030 A1 * | 11/2013 | Schindler II | B32B 37/1292 156/60 |
| 2015/0004462 A1 * | 1/2015 | Huang | H01M 2/0207 429/127 |

FOREIGN PATENT DOCUMENTS

| | | | | |
|---|---|---|---|---|
| EP | 2899776 A1 | 7/2015 | | |
| JP | 2001307708 A | 11/2001 | | |
| JP | 2002015764 A | 1/2002 | | |
| JP | 2004241172 A | 8/2004 | | |
| JP | 2005322588 A | 11/2005 | | |
| JP | 2011040379 A | 2/2011 | | |
| JP | 2011216504 A | 10/2011 | | |
| KR | WO 2011115376 A2 * | 9/2011 | .......... | H01M 2/1653 |
| WO | 9931751 A1 | 6/1999 | | |
| WO | 2004076079 A1 | 9/2004 | | |
| WO | 2013133572 A1 | 9/2013 | | |

OTHER PUBLICATIONS

International Search Report for Application No. PCT/KR2014/000487 dated May 15, 2014.

\* cited by examiner

APPARATUS FOR PREPARING ELECTRODE ASSEMBLY

CROSS-REFERENCE TO RELATED APPLICATION

This application is a continuation of International Application No. PCT/KR2014/000487 filed on Jan. 16, 2014, which claims priority under 35 USC 119(a) to Korean Patent Application No. 10-2013-0004843 filed in the Republic of Korea on Jan. 16, 2013, the disclosures of which are incorporated herein by reference.

TECHNICAL FIELD

The present disclosure relates to an apparatus for preparing an electrode assembly, more particularly an apparatus for preparing an electrode assembly which can form an adhesive layer on the surface of a substrate for electrochemical devices without the use of a solvent by way of a new laser printing, thereby quickly preparing an electrode assembly without burdens on the handling and storage of the solvent.

BACKGROUND ART

Recently, there has been an increasing interest in energy storage technology. As the application fields of energy storage technologies have been extended to cellular phones, camcorders, notebook computers, PCs and electric cars, efforts have been increasingly been made towards the research and development of electrochemical devices. In this regard, electrochemical devices are one of the subjects of great interest. Particularly, development of rechargeable secondary batteries has been the focus of attention. Recently, extensive research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries.

Generally, lithium secondary batteries consist of an anode comprising an anode active material layer, a cathode comprising a cathode active material, a separator interposed between the anode and the cathode to electrically insulate them, and a non-aqueous electrolyte solution comprising an electrolyte salt and an organic solvent.

Among these, the separator should generally satisfy the requirements of safety and heat resistance to the components of electrochemical devices, high electrolytic conductivity, and sufficient strength which can maintain its original form during its preparation, processing and application in electrochemical devices for preventing contact between both electrodes. As such a separator, a polyolefin-based porous substrate having multiple fine pores has been conventionally used.

Meanwhile, an adhesive layer may be further applied on the surface of a separator or a substrate for electrochemical devices. Conventional substrates applying an adhesive layer have been prepared by coating a polymer slurry in a solvent on a porous substrate or a porous coating layer, followed by drying. In the slurry used in coating, the solvent is for obtaining flexibility as well as proper dispersion and viscosity of polymer particles.

However, the use of such a solvent incurs costs which may also increase depending on the needs of the solvent, and in the case the solvent is harmful to the human body, there may be additional costs in handling and storage and since the solvent requires drying after coating, a production yield may decrease.

DISCLOSURE

Technical Problem

The present disclosure is designed to solve the above-mentioned problems, and therefore the present disclosure is directed to providing an apparatus for preparing an electrode assembly by forming an adhesive layer without a solvent, which allows easy handling and storage and needs no drying step of the solvent after coating to provide cost savings effect and efficient productivity due to a quick printing procedure of the adhesive layer.

Technical Solution

In accordance with one aspect of the present disclosure, there is provided an apparatus for preparing an electrode assembly, comprising a printing unit including a charging mean for bringing polymer particles into electric charging to obtain electrically charged polymer particles, and a transferring mean for coating the electrically charged polymer particles by way of transferring on at least one surface of a substrate for an electrochemical device to form an adhesive layer on the substrate, the substrate being at least one of a cathode, an anode and a separator; and a laminating unit that applies heat and pressure to the substrate having the adhesive layer formed thereon so as to obtain the electrode assembly comprising the cathode, the anode and the separator interposed therebetween.

The apparatus for preparing an electrode assembly may further comprise a separator feed for supplying the separator, a cathode feed for supplying the cathode, and an anode feed for supplying the anode.

The charging mean may include an image carrier; a latent image-forming mean for forming an electrostatic latent image on the surface of the image carrier; a storage mean for receiving polymer particles; and a polymer particle feed for supplying the polymer particles in the surface of the image carrier so as to develop the electrostatic latent image into the polymer particles in the image carrier.

The storage mean may further include inorganic particles disposed between the polymer particles and having a size of 5 to 100 nm.

The polymer particles may be selected from the group consisting of polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, alginate, carboxylmethyl cellulose and a mixture thereof.

The printing unit may form an adhesive layer having uncoated regions on at least one surface of the substrate for an electrochemical device.

The uncoated regions may occupy 20 to 70% of the total surface area of the substrate for an electrochemical device.

The transferring mean may further include a fixing mean for settling the adhesive layer formed in the substrate for an electrochemical device, by heat and pressure.

The fixing mean may settle the adhesive layer formed in the substrate for an electrochemical device, at a temperature of 60 to 180° C. and a pressure of 1 to 300 kgf/cm$^2$.

Also, the laminating unit may conduct lamination by applying a pressure of 1 to 300 kgf/cm$^2$ at a temperature of 60 to 120° C. to the substrate for an electrochemical device on which the adhesive layer is applied, thereby obtaining an electrode assembly comprising a cathode, an anode and a separator interposed therebetween.

The adhesive layer may have a thickness of 0.001 to 5 μm.

Meanwhile, the separator may consist of a porous substrate, or may comprise a porous substrate and a porous coating layer formed by coating inorganic particles and a polymer binder on at least one surface of the porous substrate.

The porous substrate may be made of any one selected from the group consisting of high-density polyethylenes, low-density polyethylenes linear low-density polyethylenes, ultra-high molecular weight polyethylenes, polypropylenes, polyethylene terephthalates, polybutylene terephthalates, polyesters, polyacetals, polyamides, polycarbonates, polyimides, polyetheretherketones, polyethersulfones, polyphenylene oxides, polyphenylene sulfides, polyethylene naphthalates, and a mixture thereof.

The inorganic particles may be selected from the group consisting of inorganic particles having a dielectric constant of 5 or higher, inorganic particles having the ability to transport lithium ions, and a mixture thereof.

Advantageous Effects

According to the present disclosure, in the preparation of an electrode assembly, an adhesive layer is formed on a substrate for an electrochemical device by way of laser printing using electrostatic charging without a solvent, thereby allowing easy handling and storage and needing no drying step of the solvent to provide cost savings effect and quick preparation procedures.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

EXPLANATION OF REFERENCE NUMERALS

10: Separator Feed
11: Separator
12: Adhesive Layer
20: Cathode Feed
21: Cathode
30: Anode Feed
31: Anode
40: Electrode Assembly
100: Printing Unit
101: Photoconductor
102: Charging mean for photoconductor
103: Light
104: Developing Machine
105: Developing Roller
106: Supply Roller
107: Blade for Controlling Polymer Particles
108: Polymer Particles
108': Remaining Polymer Particles
109: Transferring Mean
110: Cleaning Blade
111: AC voltage
200: Laminating Unit

BEST MODE

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Accordingly, the embodiments proposed herein are just a preferable example for the purpose of illustrations only, not intended to limit the scope of the disclosure, so it should be understood that other equivalents and modifications could be made thereto without departing from the spirit and scope of the disclosure.

An apparatus for preparing an electrode assembly according to one embodiment of the present disclosure comprises a printing unit including a charging mean for bringing polymer particles into electric charging to obtain electrically charged polymer particles, and a transferring mean for coating the electrically charged polymer particles by way of transferring on at least one surface of a substrate for an electrochemical device to form an adhesive layer on the substrate, the substrate being at least one of a cathode, an anode and a separator; and a laminating unit that applies heat and pressure to the substrate having the adhesive layer formed thereon so as to obtain the electrode assembly comprising the cathode, the anode and the separator interposed therebetween.

Figure 1:
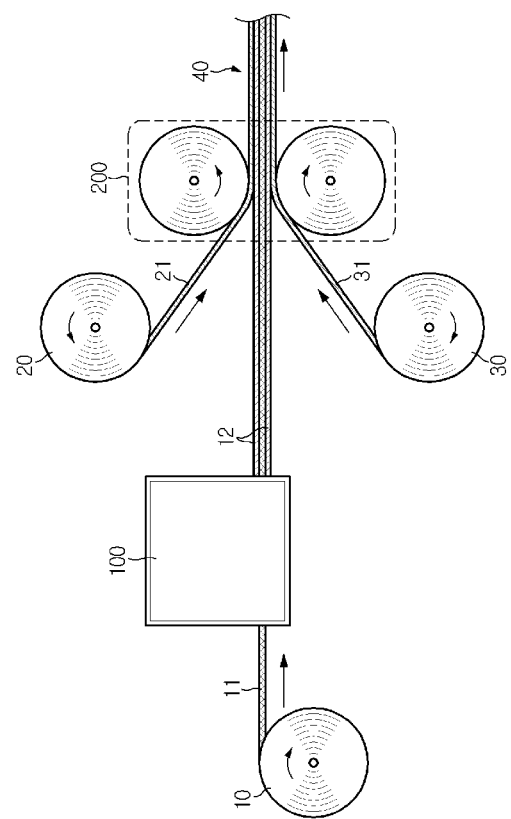
FIG. 1 schematically shows an apparatus for preparing an electrode assembly according to one embodiment of the present disclosure.

FIG. 1 shows the case that the above-mentioned substrate for an electrochemical device on which an adhesive layer is formed is a separator. The apparatus for preparing an electrode assembly according to the present disclosure will be explained with reference to FIG. 1 below.

The apparatus for preparing an electrode assembly of the present disclosure comprises a printing unit 100 including a charging mean for bringing polymer particles into electric charging to obtain electrically charged polymer particles, and a transferring mean for coating the electrically charged polymer particles by way of transferring on at least one surface of a separator 11 to form an adhesive layer 12 on the separator; and a laminating unit 200 that conducts lamination by interposing the separator 11 provided with the adhesive layer 12 between a cathode 21 and an anode 31 and applying heat and pressure thereto.

The apparatus for preparing an electrode assembly may further comprise a separator feed 10 for supplying the separator 11, a cathode feed 20 for supplying the cathode 21, and an anode feed 30 for supplying the anode 31.

The separator 11 is supplied from the separator feed 10 to the printing unit 100, and the printing unit 100 which includes a charging mean and a transferring mean allows the formation of the adhesive layer 12 on at least one surface of the separator 11 by way of laser printing, followed by discharging.

The charging mean may include an image carrier; a latent image-forming mean for forming an electrostatic latent image on the surface of the image carrier; a storage mean for receiving polymer particles; and a polymer particle feed for supplying the polymer particles in the surface of the image carrier so as to develop the electrostatic latent image into the polymer particles in the image carrier.

The storage mean may further include inorganic particles disposed between the polymer particles so as to improve the fluidity of the polymer particles, and the inorganic particles may have a size of 5 to 100 nm, and examples thereof may be silica nanoparticles, but the present disclosure is not limited thereto.

The polymer particles may be selected from the group consisting of polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, alginate, carboxylmethyl cellulose and a mixture thereof.

Although the above mentions are for the case that the substrate for an electrochemical device provided with an adhesive layer is a separator, the adhesive layer may be similarly formed on a cathode or an anode, in which a printing unit may be disposed to be connected with a cathode feed or an anode feed for the formation of the adhesive layer on the cathode and the anode.

Meanwhile, if the adhesive layer is provided on the whole of one or both surface(s) of the substrate for an electrochemical device, it allows to improve adhesiveness between the separator and the electrodes while may act as a resistor in transferring lithium ions to deteriorate the performances of electrochemical devices. Therefore, in order to maintain adhesiveness and simultaneously inhibit an excessive rise in resistance, the printing unit may form an adhesive layer comprising uncoated regions in which polymer particles are not transferred on at least one surface of the substrate for an electrochemical device.

The surface area of the uncoated regions may be 20 to 70% of the total surface area of the substrate for an electrochemical device. When such a numerical range is satisfied, suitable adhesiveness between the separator and the electrodes can be maintained and the excessive rise of resistance can be inhibited simultaneously.

The adhesive layer may have a thickness of 0.001 to 5 μm, but the present disclosure is not limited thereto. When such a thickness range is satisfied, a resistance rise within batteries can be inhibited and suitable adhesiveness between the separator and the electrodes can be maintained simultaneously.

Also, the adhesive layer may be formed in a pattern that is favorable in transferring lithium ions, for example, a lattice pattern.

The transferring mean may further include a fixing mean for settling the adhesive layer formed in the substrate for an electrochemical device, by heat and pressure.

The fixing mean may settle the adhesive layer formed in the substrate for an electrochemical device, at a temperature of 60 to 180° C. and a pressure of 1 to 300 kgf/cm$^2$.

In addition, the laminating unit may conduct lamination by applying a pressure of 1 to 300 kgf/cm$^2$ at a temperature of 60 to 120° C. to the substrate for an electrochemical device on which the adhesive layer is applied, thereby obtaining an electrode assembly comprising a cathode, an anode and a separator interposed therebetween. When such temperature and pressure ranges are satisfied, sufficient adhesiveness can be obtained.

Meanwhile, the separator which may be used in the present disclosure is a porous substrate, and the porous substrate may be any one which has been conventionally used in lithium secondary batteries, for example a polyolefin-based porous membrane or a non-woven fabric, but the present disclosure is not particularly limited thereto.

The polyolefin-based porous membrane may be obtained from a polyolefin-based polymer, for example, polyethylene such as high-density polyethylene, linear low-density polyethylene, low-density polyethylene and ultra-high molecular weight polyethylene, polypropylene, polybutylene, polypentene or a mixture thereof.

As the non-woven fabric, in addition to the polyolefin-based non-woven fabric, a non-woven fabric made of a polymer selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate and a mixture thereof may be used. The non-woven fabric may be a spun-bond or melt-blown fabric consisting of long fibers in structure.

The porous substrate has preferably a thickness of 5 to 50 μm, but is not particularly limited thereto. Also, the porous substrate has a pore size of 0.01 to 50 μm and a porosity of 10 to 95%, but is not particularly limited thereto.

Also, the separator may comprise a porous substrate and a porous coating layer formed by coating inorganic particles and a polymer binder on at least one surface of the porous substrate.

As the inorganic particles, inorganic particles having a high dielectric constant may be used to increase a dissociation rate of an electrolyte salt, e.g., a lithium salt, in a liquid electrolyte, thereby improving an ionic conductivity of the electrolyte.

For the foregoing reasons, the inorganic particles used in the present disclosure preferably include inorganic particles having a dielectric constant of 5 or higher, preferably 10 or higher, inorganic particles having the ability to transport lithium ions, and a mixture thereof.

Non-limiting examples of the inorganic particles having a dielectric constant of 5 or higher include $SrTiO_3$, $SnO_2$, $CeO_2$, $MgO$, $NiO$, $CaO$, $ZnO$, $ZrO_2$, $SiO_2$, $Y_2O_3$, $Al_2O_3$, $AlOOH$, $Al(OH)_3$, $TiO_2$, $SiC$, $BaTiO_3$, $Pb(Zr_x Ti_{1-x})O_3$ (PZT, $0<x<1$), $Pb_{1-x}La_xZr_{1-y}Ti_yO_3$ (PLZT, $0<x<1$, $0<y\le1$), $(1-x)Pb(Mg_{1/3}Nb_{2/3})O_3-xPbTiO_3$ (PMN-PT, $0<x<1$), $HfO_2$ inorganic particles and a mixture thereof.

Among these, inorganic particles such as $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$) and hafnia ($HfO_2$) exhibit a high dielectric characteristic of a dielectric constant of 100 or higher, as well as piezoelectricity which occurs when constant pressure is applied to induce a potential difference between both surfaces, thereby preventing the generation of internal short circuit between both electrodes due to external impact and thus further improving the safety of electrochemical devices. Also, when a mixture of inorganic particles having a high dielectric constant and inorganic particles having the ability to transport lithium ions is used, the synergetic effect thereof can be obtained.

In the present disclosure, the inorganic particle having the ability to transport lithium ions refers to inorganic particles containing lithium atom which are capable of moving lithium ions without storing the lithium. The inorganic particle having the ability to transport lithium ions may transfer and move lithium ions due to a kind of defect existing in the particle structure, so it is possible to improve lithium ion conductivity in the battery and also improve the performance of the battery. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

The inorganic particles may have an average diameter of 0.001 to 100 μm, preferably 0.01 to 50 μm. When such a diameter range of the inorganic particles is satisfied, the specific surface area of the inorganic particles becomes remarkably increased to solve the problem that a binder for binding the inorganic particles is used in an excess of amounts, and also it can provide a proper thickness of the porous coating layer, a proper pore size between the inorganic particles and a proper porosity.

Also, the porous coating layer may have a thickness of 1 to 100 μm, preferably 1 to 40 μm, more preferably 2 to 15 μm.

When such a thickness range of the porous coating layer is satisfied, an additional transferring path of lithium ions can be further added and the impregnation of an electrolyte solution can improve to enhance the performances and thermal safety of batteries.

Meanwhile, after the adhesive layer 12 discharged from the printing unit 100 is formed on the separator, the separator is interposed between the cathode 21 supplied from the cathode feed 20 and the anode 31 supplied from the anode feed 30, and fed into the laminating unit 200. In the laminating unit 200, heat and pressure are applied to the combination of the cathode, the separator and the anode for their lamination, thereby producing an electrode assembly. The laminating unit 200 may comprise at least two rolls which are opposed to each other, but is not limited thereto, for example, a general laminating system may also be used.

Figure 2:
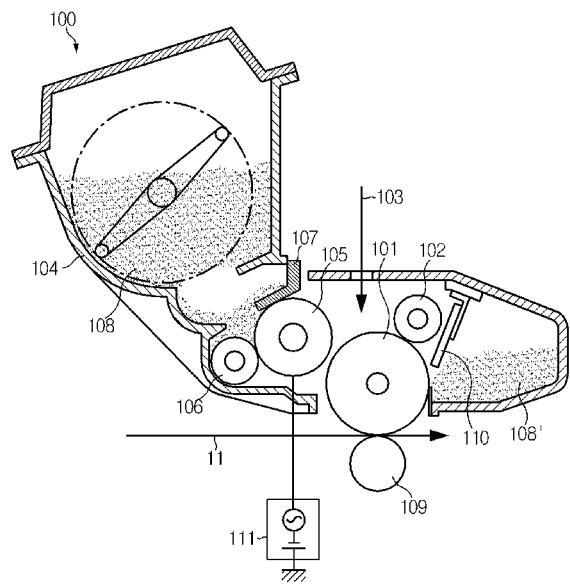
FIG. 2 schematically shows a printing unit used in an apparatus for preparing an electrode assembly according to one embodiment of the present disclosure.

The printing unit 100 will be more specifically explained with reference to FIG. 2.

Polymer particles 108 which are placed in a developer 104 are supplied in a developing roller 105 by a feed roller 106 made of an elastic material such as polyurethane foam and sponge. The polymer particles 108 supplied in the developing roller 105 reach a contact part between a polymer particle-controlling blade 107 and the developing roller 105 by the rotation of the developing roller 105. The polymer particle-controlling blade 107 is made of an elastic material such as a metal and a rubber. When the polymer particles 108 pass though a contact part between a polymer particle-controlling blade 107 and the developing roller 105, the polymer particles 108 are constantly controlled so that it forms a thin layer and is sufficiently charged. The thin-layered polymer particles 108 are transferred into a developing section in which the polymer particles 108 are developed into the electrostatic image of a photoconductor 101 acting as an image carrier. The electrostatic image is formed by scanning light 103 in the photoconductor 101.

The developing roller 105 is opposite to the photoconductor 101 at a certain interval without a contact with each other. The developing roller 105 rotates clockwise while the photoconductor 101 rotates anticlockwise.

The polymer particles 108 transferred into the developing section of the photoconductor 101 are developed into the electrostatic image formed in the photoconductor 101 by electric force which is generated from a potential difference between the potential of DC voltage-overlapped AC voltage 111 that is applied by the developing roller 105 and the potential of the electrostatic image of the photoconductor 101 that is charged by a charging mean 102.

The polymer particles 108 developed in the photoconductor 101 reach a transferring mean 109 according to the rotation direction of the photoconductor 101. The transferring mean 109 is applied with a reverse polarity of high voltage against the polymer particles 108 developed in the photoconductor 101. While the separator passes between such a transferring mean 109 and the photoconductor, like a corona discharger or rollers, the polymer particles 108 are transferred into the separator 11 to form an adhesive layer.

The image of the polymer particles transferred into the separator is fused in the separator during passing through a high temperature and high pressure of fixing mean (not shown), from which the adhesive layer is fixed. Meanwhile, undeveloped polymer particles 108' remained on the developing roller 105 are recovered by a supply roller 106 which comes into contact with the developing roller 105, and undeveloped polymer particles 108' remained on the photoconductor 101 are recovered by a cleaning blade 110. Such a procedure is repeated.

An electrode assembly prepared by the apparatus of the present disclosure comprises a cathode, an anode and a separator interposed therebetween.

In the present disclosure, electrodes to be used as the cathode and the anode are not particularly limited, and may be manufactured by binding an electrode active material to an electrode current collector according to a conventional method known in the art.

As active materials used in each electrode, a cathode active material may be any of those that are commonly used in cathodes of conventional electrochemical devices. Non-limiting examples of the cathode active material include lithium manganese oxides, lithium cobalt oxides, lithium nickel oxides, lithium iron oxides, and lithium composite oxides thereof.

Also, an anode active material may be any of those that are commonly used in anodes of conventional electrochemical devices. Non-limiting examples of the anode active material include lithium, lithium alloys, and lithium intercalation materials such as carbon, petroleum coke, activated carbon, graphite and other carbonaceous materials.

Non-limiting examples of a cathode current collector include aluminum foils, nickel foils and a combination thereof. Non-limiting examples of an anode current collector include copper foils, gold foils, nickel foils, copper alloy foils and a combination thereof.

The electrode assembly prepared by the apparatus of the present disclosure may be in the form of general windings, as well as stack and folding according to follow-up processes, from which the final shape of lithium secondary batteries is determined.

Also, the electrode assembly is stored in a battery case such as a cylindrical form such as a can, a prismatic form, a pouch form, or a coin form.

In the battery case storing the electrode assembly, a non-aqueous electrolyte that is impregnated into the electrode assembly and comprises an electrolyte salt and an organic solvent is introduced. The introduction of the non-aqueous electrolyte may be carried out in any suitable step during the manufacturing of the electrochemical device depending on the manufacturing processes and desired physical properties of a final product. Specifically, the electrolyte may be introduced before assembling a battery or in the final step of the assembling.

The electrolyte salt may be a lithium salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF_9^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$ and a mixture thereof.

The organic solvent used in the non-aqueous electrolyte solution may be one which is conventionally used in an electrolyte solution for a lithium secondary battery. For example, an ether, an ester, an amide, a linear carbonate and a cyclic carbonate may be used alone or as a mixture of two or more.

Among these, a linear carbonate, a cyclic carbonate, or a mixture thereof is representatively used.

The cyclic carbonate compound may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof. Examples of the halide include fluoroethylene carbonate (FEC) and the like, but are not limited thereto.

The linear carbonate compound may be any one selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

Hereinafter, preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

Example

100 Parts by weight of polyvinylidene fluoride-co-hexafluoropropylene particles having an average diameter of 0.2 μm (Arkema, Kynar 2751) were used as polymer particles and mixed with 2 parts by weight of silica nanoparticles (Degusa, Aerosil R805) in a Henschel mixer for 5 minutes so that the fluidity of the polymer particles can be obtained. The resulting mixture was put in a storage mean included in a printing unit.

Then, a non-woven substrate (Mitsubishi Paper Mill, LP1540) was passed from a separator feed to the printing unit, thereby printing the polymer particles on both surfaces of the non-woven substrate.

After printing, an LMO-based cathode supplied from a cathode feed, an LTO-based anode supplied from an anode feed, and the non-woven substrate printed with the polymer particles and interposed between the cathode and the anode were passed through a laminating unit with applying a pressure of 100 kgf/cm$^2$ at 100° C. for their lamination, thereby obtaining an assembly.

The assembly was put in a battery case, in which an electrolyte solution was introduced, to prepare a lithium secondary battery.

The lithium secondary battery thus prepared was measured to have good discharge resistance of 1.25Ω.

Figure 3:
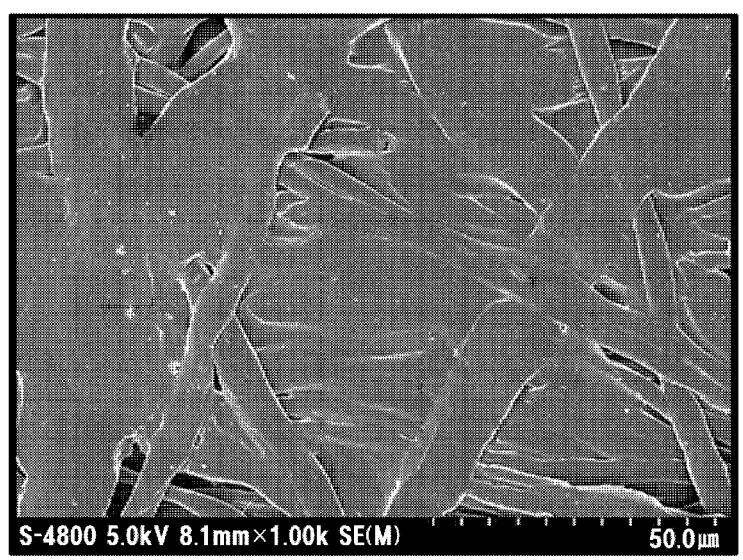
FIG. 3 is an SEM photograph showing the surface of a separator obtained by disassembling an electrode assembly prepared from the apparatus of one embodiment of the present disclosure.

Meanwhile, FIG. 3 is an SEM photograph showing a surface of a separator which is disassembled from the electrode assembly.

Comparative Example

The procedures of the Example were repeated except that the step of printing polymer particles on a non-woven substrate was not carried out to prepare a lithium secondary battery.

The lithium secondary battery prepared was measured to have a discharge resistance of 1.44Ω, which is higher than that of the Example.

The foregoing disclosure is given by way of illustration only, and various changes and modifications within the spirit and scope of the disclosure will become apparent to those skilled in the art from this detailed description. Accordingly, it should be understood that the Examples of the present disclosure are provided for the purpose of illustrations only and to better explain to a person having ordinary skill in the art, and is not intended to limit the scope of the present disclosure. The scope of the present to be protected should be defined by the claims, all technical spirits equivalent thereto should be interpreted to be fallen within the scope of the present disclosure.

What is claimed is:

1. An apparatus for preparing an electrode assembly for a lithium secondary battery, comprising
   a substrate supply roll for supplying a continuous feed of a substrate for the lithium secondary battery, the substrate being at least one of a cathode, an anode, and a separator;
   a printing unit for receiving the continuous feed of the substrate, the printing unit including:
      an electrically chargeable image carrier for receiving electrically charged polymer particles developed into an electrostatic latent image, and
      a transferring mean for coating the electrostatic latent image of the electrically charged polymer particles onto the continuous feed of the substrate by transferring the electrically charged polymer particles onto at least one surface of the continuous feed of the substrate in order to form an adhesive layer on the substrate; and a laminating unit that applies heat and pressure to the substrate for the lithium secondary battery having the adhesive layer formed thereon so as to obtain the electrode assembly comprising the cathode, the anode and the separator interposed therebetween.

2. The apparatus of claim 1, wherein the substrate is the separator, and wherein the apparatus further comprises
a cathode feed for supplying the cathode, and
an anode feed for supplying the anode.

3. The apparatus of claim 1, wherein the printing unit includes
a latent image-forming mean for forming the electrostatic latent image on a surface of the image carrier;
a storage mean for receiving the polymer particles; and
a polymer particle feed for supplying the polymer particles in the surface of the image carrier so as to develop the polymer particles into the electrostatic latent image on the image carrier.

4. The apparatus of claim 3, wherein the storage mean further includes inorganic particles disposed between the polymer particles and having a size of 5 to 100 nm.

5. The apparatus of claim 1, wherein the polymer particles are selected from the group consisting of polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, alginate, carboxyl methyl cellulose and a mixture thereof.

6. The apparatus of claim 1, wherein the transferring mean further includes a fixing mean for settling the adhesive layer formed in the substrate for the lithium secondary battery, by heat and pressure.

7. The apparatus of claim 6, wherein the fixing mean settles the adhesive layer formed in the substrate for the lithium secondary battery, at a temperature of 60 to 180° C. and a pressure of 1 to 300 kgf/cm$^2$.

8. The apparatus of claim 1, wherein the laminating unit conducts lamination by applying a pressure of 1 to 300 kgf/cm$^2$ at a temperature of 60 to 120° C. to the substrate for the lithium secondary battery on which the adhesive layer is applied, thereby obtaining an electrode assembly comprising a cathode, an anode and a separator interposed therebetween.

9. The apparatus of claim 1, wherein the adhesive layer has a thickness of 0.001 to 5 μm.

10. The apparatus of claim 1, wherein either the separator consists of a porous substrate, or the separator comprises a porous substrate and a porous coating layer formed by coating inorganic particles and a polymer binder on at least one surface of the porous substrate.

11. The apparatus of claim 10, wherein the porous substrate is selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

12. The apparatus of claim 10, wherein the inorganic particles are selected from the group consisting of inorganic particles having a dielectric constant of 5 or higher, inorganic particles having the ability to transport lithium ions, or a mixture thereof.

13. The apparatus of claim 1, wherein the printing unit forms an adhesive layer having uncoated regions on at least one surface of the substrate for the lithium secondary battery, the uncoated regions occupying 20 to 70% of the total surface area of the substrate for the lithium secondary battery.

14. The apparatus of claim 1, wherein the adhesive layer is formed in a lattice pattern.

15. The apparatus of claim 1, wherein the transferring mean is chargeable with a reverse polarity from the image carrier.

16. The apparatus of claim 1, wherein the continuous feed of the substrate passes between the image carrier and the transferring mean for having the electrically charged polymer particles coated thereon by having the electrically charged polymer particles transferred from the image carrier onto the at least one surface of the continuous feed of the substrate.

17. An apparatus for preparing an electrode assembly for a lithium secondary battery, comprising:
a printing unit for receiving a substrate for the lithium secondary battery, the substrate being at least one of a cathode, an anode, and a separator, the printing unit including:
an electrically chargeable image carrying roller for receiving electrically charged polymer particles developed into an electrostatic latent image, and
a transferring mean chargeable with a reverse polarity from the image carrying roller and positioned opposite the image carrying roller, such that the substrate passes between the image carrying roller and the transferring mean, wherein the transferring mean is adapted to coat the electrostatic latent image of the electrically charged polymer particles from the image carrying roller onto the substrate by transferring the electrically charged polymer particles onto at least one surface of the substrate as the substrate passes between the image carrying roller and the transferring mean, whereby the electrically charged polymer particles transferred onto the at least one surface of the substrate form an adhesive layer on the substrate; and
a laminating unit that applies heat and pressure to the substrate for the lithium secondary battery having the adhesive layer formed thereon so as to obtain the electrode assembly comprising the cathode, the anode and the separator interposed therebetween.

18. The apparatus of claim 17, further comprising a substrate supply for supplying a continuous feed of the substrate for the lithium secondary battery.

19. The apparatus of claim 17, wherein the printing unit forms an adhesive layer having uncoated regions on at least one surface of the substrate for the lithium secondary battery, the uncoated regions occupying 20 to 70% of the total surface area of the substrate for the lithium secondary battery.

20. The apparatus of claim 17, wherein the adhesive layer is formed in a lattice pattern.

* * * * *